United States Patent
Boston et al.

(10) Patent No.: US 6,582,520 B1
(45) Date of Patent: *Jun. 24, 2003

(54) DROSS COLLECTING ZINC POT

(75) Inventors: Steven L. Boston, Newburgh, IN (US); David J. Meneice, Ashland, KY (US)

(73) Assignee: AK Steel Corporation, Middletown, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,660

(22) Filed: Dec. 9, 1997

(51) Int. Cl.$^7$ .............................. B05C 19/02

(52) U.S. Cl. ...................... 118/423; 118/620

(58) Field of Search .............. 228/56.1, 34; 118/429, 118/423, 610, 422

(56) References Cited

U.S. PATENT DOCUMENTS

| | | |
|---|---|---|
| 220,768 A | 10/1879 | Morewood |
| 2,159,297 A | 5/1939 | Shover |
| 2,166,249 A | 7/1939 | Herman |
| 2,377,632 A | 6/1945 | Keller |
| 2,604,415 A * | 7/1952 | Whitfield et al. ............ 118/420 |
| 3,828,723 A | 8/1974 | Herman |
| 3,871,632 A | 3/1975 | Wunsche |
| 4,137,347 A | 1/1979 | Graff et al. |
| 4,152,471 A * | 5/1979 | Schnedler et al. ............ 118/65 |
| 4,254,158 A | 3/1981 | Fukuzuka et al. |
| 4,275,098 A | 6/1981 | Gunji et al. |
| 4,330,574 A | 5/1982 | Pierson et al. |
| 4,408,561 A * | 10/1983 | Yokoyama et al. ............ 118/64 |
| 4,437,605 A | 3/1984 | Tucker et al. |
| 4,476,805 A | 10/1984 | Higuchi et al. |
| 4,478,892 A | 10/1984 | Amberson |
| 4,552,788 A | 11/1985 | Sato et al. |
| 4,672,912 A | 6/1987 | Derrico |
| 4,883,723 A | 11/1989 | Kilbane et al. |
| 4,940,384 A | 7/1990 | Amra et al. |
| 5,020,779 A | 6/1991 | Lindblom et al. |
| 5,135,781 A | 8/1992 | Schluckebier et al. |
| 5,203,681 A | 4/1993 | Cooper |

(List continued on next page.)

FOREIGN PATENT DOCUMENTS

| | | |
|---|---|---|
| JP | 154948 A | 9/1992 |
| JP | 168256 A | 9/1992 |
| JP | 346642 A | 12/1992 |
| JP | 222500 A | 8/1993 |

OTHER PUBLICATIONS

"Galvanizing," Third Edition, 1950, written by Heinz Bablik.

"The Making, Shaping and Treating of Steel," edited by H.E. McGannon, Tenth Edition, 1984.

Sales literature distributed by the FOEN Machine Company.

"Dross Foundation and Flow Phenomena in Molten Zinc Bath," presented by Kawasaki Steel at the 1995 GALVATECH Conference.

*Primary Examiner*—Brenda A. Lamb
(74) *Attorney, Agent, or Firm*—Frost Brown Todd LLC

(57) ABSTRACT

A zinc-coating pot for galvanizing steel strip has two levels along its bottom surface. The first, shallower level is located under a coating roll, thereby creating an area where the molten zinc-coating metal flow rate is relatively high. Dross particles remain suspended and do not accumulate on the bottom of the zinc-coating pot in this region. A second, deeper level is located to one side of the first level. This second level creates a space wherein the molten metal flow rate is less than the terminal velocity of the dross particles. This encourages sedimentation of the dross particles in this region. It provides an accumulation area for any bottom dross to be later removed by a dross removal mechanism, such as mechanical scoops or by pumping, without interruption to the coating process.

11 Claims, 3 Drawing Sheets

U.S. PATENT DOCUMENTS

| | | |
|---|---|---|
| 5,310,412 A | 5/1994 | Gilbert et al. |
| 5,470,201 A | 11/1995 | Gilbert et al. |
| 5,518,772 A | 5/1996 | Andachi et al. |
| 5,558,715 A | 9/1996 | Abed et al. |
| 5,586,863 A | 12/1996 | Gilbert et al. |
| 5,587,017 A | 12/1996 | Yamanaka et al. |
| 5,597,289 A | 1/1997 | Thut |
| 5,683,650 A * | 11/1997 | Morando |

* cited by examiner

DROSS COLLECTING ZINC POT

BACKGROUND OF THE INVENTION

This invention pertains to a coating pot for coating metal strip with a zinc-containing metal. More particularly, it pertains to a coating pot shaped so as to encourage the sedimentation of bottom dross in a collecting area of the coating pot so that the bottom dross can be contained until removed and then removed without interfering with the coating process.

Steel is coated with zinc to protect it from corrosion. Zinc coatings can be applied by dipping or passing the steel article to be coated through a molten bath of the zinc-containing metal. This process is referred to as "galvanizing", "hot galvanizing" or "hot-dip galvanizing".

The coating process can be operated continuously when the steel to be coated is a strip, which is typically wound on a coil. The strip is unwound from the coil and cleaned, annealed and/or otherwise prepared before it enters the molten bath. It is directed under a coating roll that is submerged in the bath. After traveling under the coating roll, the strip exits the bath.

During the coating process, drosses can form in the molten bath. One form of dross, bottom dross, is predominately delta phase ($FeZn_7$) of zinc-iron intermetallics. The dross particles are slightly denser than molten zinc. As they form in the galvanizing bath, they are initially small and suspended by the movement of liquid currents in the zinc bath. However, the particles typically grow by Oswald ripening. The particles settle to the bottom of the zinc coating pot after reaching a critical size.

Once a significant amount of bottom dross is accumulated, turbulence, caused, for example, by the steel strip passing through the bath, can dislodge particles of the accumulated bottom dross and bring it into contact with the steel strip. This results in defects in the finished coated strip. The resultant defective product must be scrapped or sold as low quality product.

Dross is typically removed at regular intervals from the coating pot. Generally, it is removed by scooping it from the bottom of the coating pot. In order to do this, the coating operation has to be shut down during this removal procedure because the dross is deposited across the entire bottom of the coating pot. This down-time is expensive and inefficient in an otherwise continuous operation. It would be preferable if the dross could be removed without interrupting the coating process in a manner that would not result in surface defects in the coated metal strip.

There have been many efforts to minimize-bottom dross. For example, U.S. Pat. No. 220,768, issued to Morewood, on Oct. 21, 1879, discloses a two-level coating tank, wherein a first part of the tank is deeper than a second part of the tank. The more shallow part of the tank has baffles at the top of the tank to collect surface "scruff" or dross, which is a mixture of zinc metal, zinc oxides and iron-aluminum-zinc intermetallic particles. The patent does not discuss the use of a two-level tank to address bottom dross. Unlike the present invention, coating occurs in both the deep and shallow sections of the tank.

U.S. Pat. No. 2,159,297, issued to Shover, on Jul. 26, 1932, describes an apparatus for coating metal. The patent discloses the use of a pipe attached to the bottom of the coating chamber that allows for the removal of settled bottom dross. It does not teach the use of a two-level tank to encourage the sedimentation of the dross in a specialized collecting area, away from the coating area, so that the dross does not reduce coating quality.

U.S. Pat. No. 4,275,098, issued to Gunji et al., on Jun. 23, 1981, describes a method and apparatus for continually hot dip galvanizing steel strip. The patent discloses a two-section coating pot wherein the first section, where the metal coating occurs, has an angled bottom with an opening into a deeper, second section. The purpose of the angled coating chamber is to allow bottom dross to fall into the deeper section where it is reacted with aluminum to produce surface dross. The bottom dross-free material is recycled back into the coating section and the surface dross is mechanically removed. The patent does not disclose the use of any means to remove the bottom dross from the deeper chamber; rather it requires the reaction of the bottom dross with aluminum to produce surface dross. The patent also teaches the use of an impeller to increase the stirring effects and enhance the reaction of the bottom dross with the aluminum, in contrast to the present invention, which requires a collecting area that minimizes stirring. Furthermore, dross will not slide down the inclined portion as suggested in the patent; it stays where it drops. This means dross, will not accumulate in the deeper section of the patented apparatus. Dross settles where the molten metal flow rate is low. The patented apparatus, by encouraging mixing in and flow through the deeper section, will not allow the dross to collect there.

U.S. Pat. No. 4,476,805, issued to Higuchi et al., on Oct. 16, 1984, describes an apparatus for coating only one side of a steel strip with a molten coating metal. The patent discloses a two-level melt pot. The patented apparatus is a spray coater, in contrast to the dip coating method of the present invention. The patent does not discuss the benefits of a two-level melt pot. There is no suggestion that dross is less likely to settle in the shallower end. Nor is there any suggestion that a deeper end promotes sedimentation. Furthermore, coating in the patented apparatus must be halted to remove the collected dross. This is in contrast to the present invention where dross can be removed from the bottom while strip is being coated.

U.S. Pat. No. 5,587,017, issued to Yamanaka et al., on Dec. 24, 1996, describes a process and apparatus for producing metal coated steel sheets. The patent teaches the use of a shallow portion in the coating tank under the sink roll to enhance sedimentation in the deeper portions of the tank created by the raised portion. The present invention provides for a shallow portion under the sink roll and in front of the sink roll. It is important to maintain a shallow area in front of the sink roll so as to inhibit sedimentation in that area. If dross builds up in front of the sink roll, the coating operation must be shut down to clean it out. With the present invention, dross is encouraged to settle only in the deeper, back portion of the pot away from the sink roll so that it can be removed without interfering with the coating operation. This structure and its related benefit are not disclosed or suggested by the patent. Furthermore, the sharp edges in the patented apparatus do not suggest the angled slope of the present invention. The angled slope is easier to clean—the cleaning equipment could tear off sharp edges in the patented device.

SUMMARY OF THE INVENTION

The present invention provides a coating pot for coating metal strip with a zinc-containing metal comprising a coating portion and a collecting portion, wherein the depth of the collecting portion is greater than the depth of the coating portion, and wherein the collecting portion is sized and located so that:

a. the collecting portion is located to only one side of the coating portion;

b. dross accumulates in the collecting portion;

c. the molten zinc-containing metal circulates in the collecting portion at a velocity less than the terminal velocity of the dross; and, d. the dross can be removed from the collecting portion without interrupting the coating process.

The present invention also provides a coating apparatus comprising a coating pot with a coating portion and a collecting portion, a coating roll and a dross removal mechanism.

DETAILED DESCRIPTION OF THE PREFERRED EMBODIMENT

Figure 1:
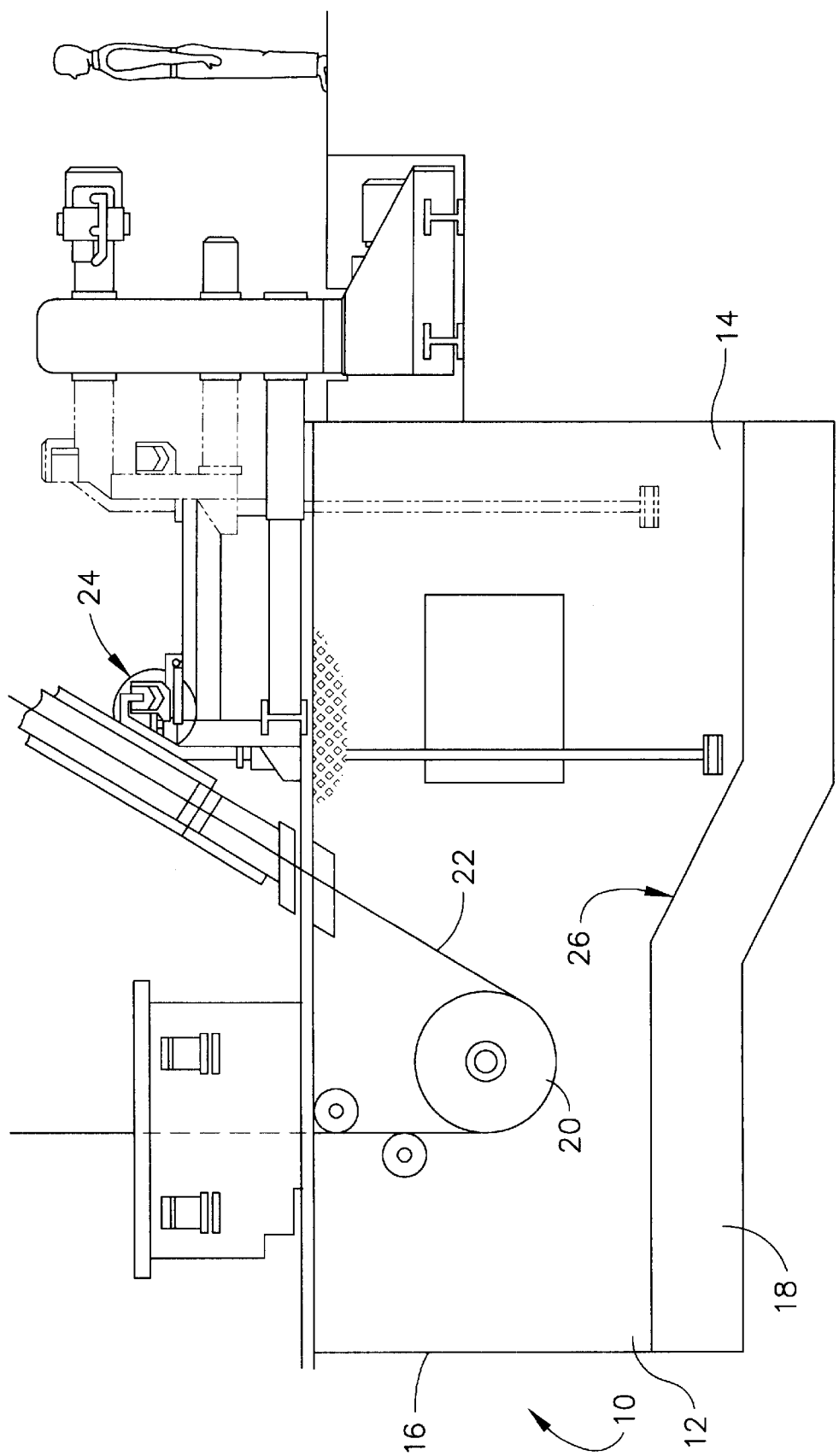
FIG. 1 is a side elevational schematic of a coating pot of the present invention.
Figure 2:
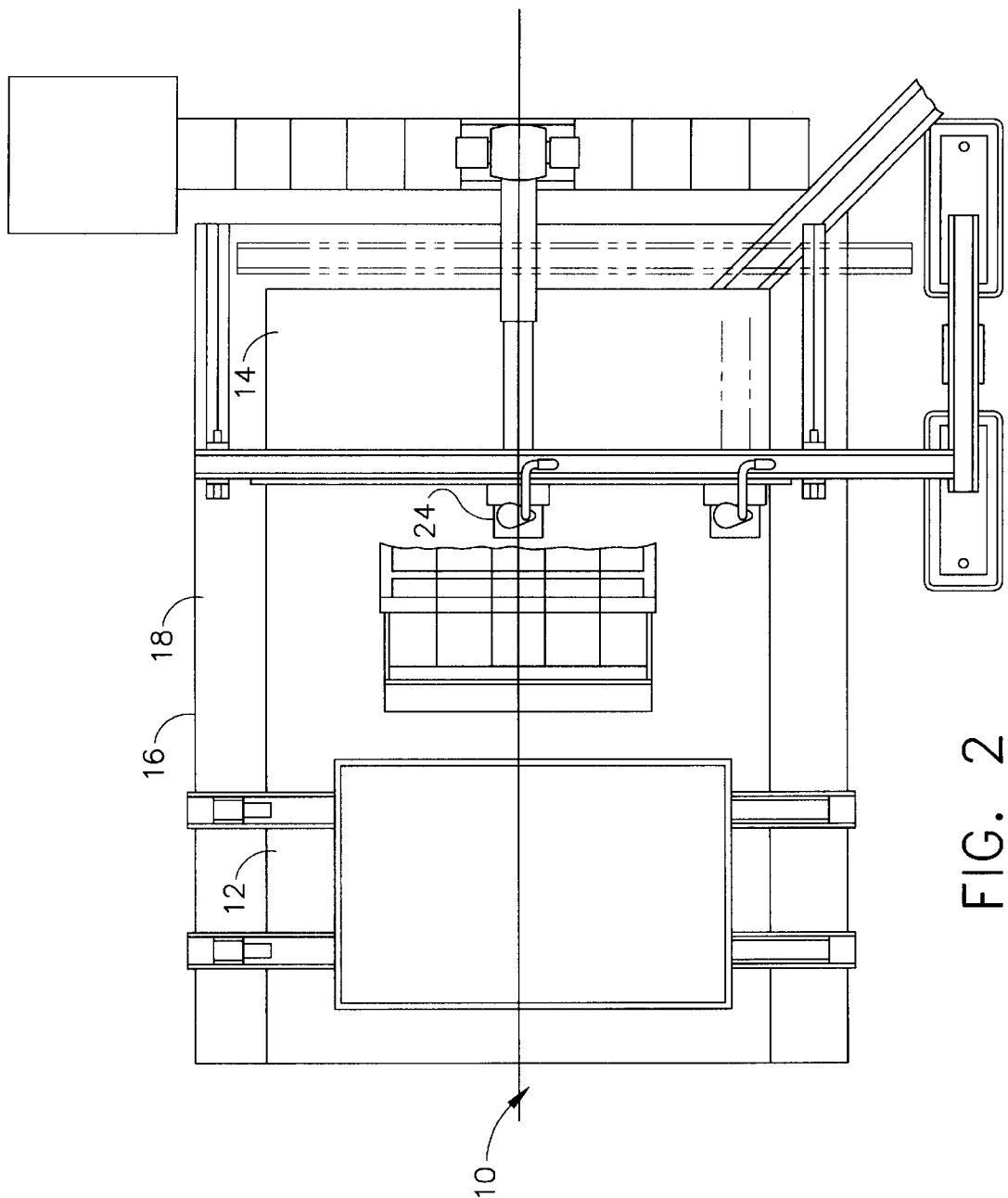
FIG. 2 is a top schematic of a coating pot of the present invention.
Figure 3:
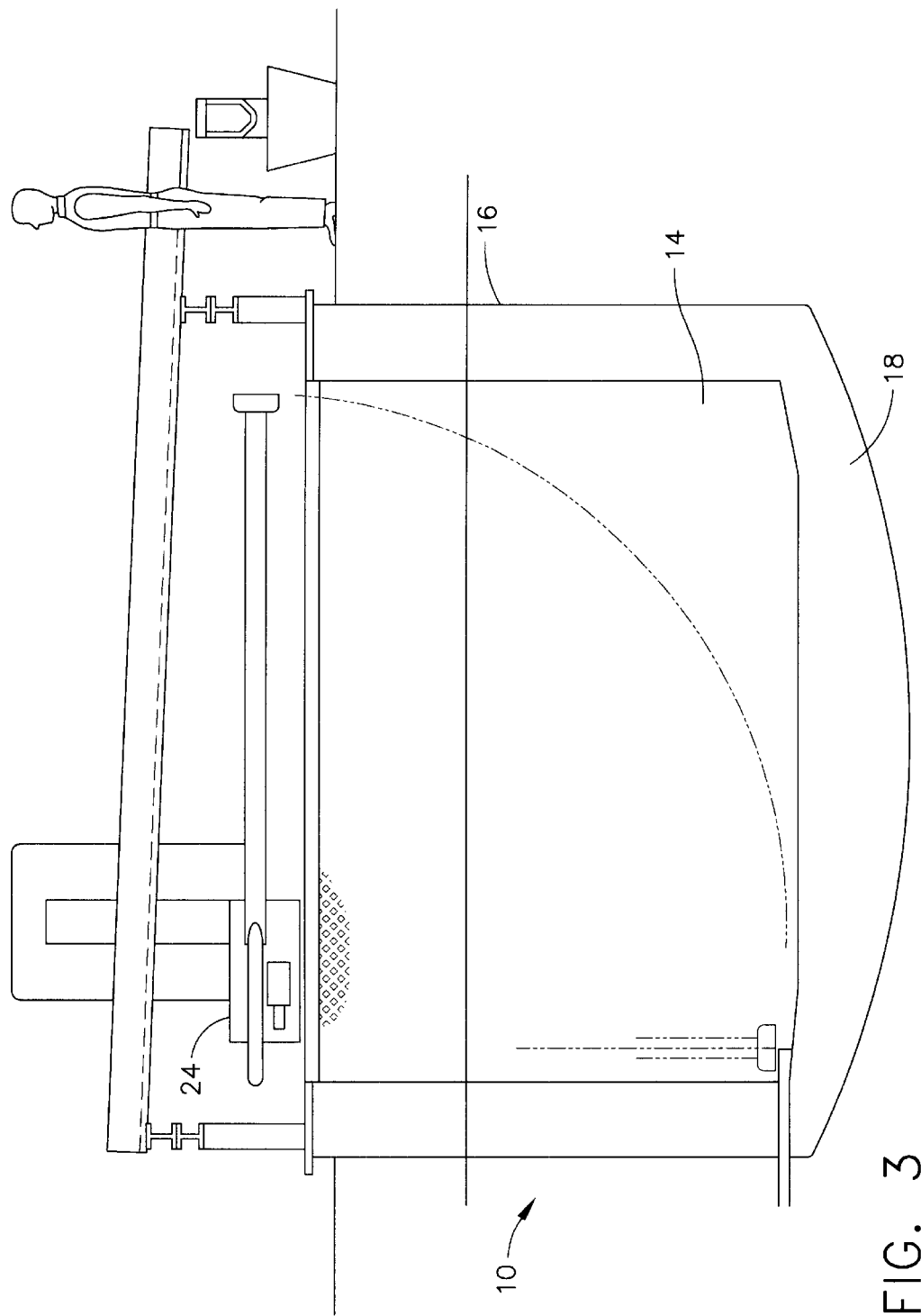
FIG. 3 is a back elevational schematic of a coating pot of the present invention.

As shown in the FIGS. 1–3, the coating pot 10 of the present invention has a coating portion 12 and a collecting portion 14. The collecting portion 14 is deeper than the coating portion 12 of the pot and it is located to one side of the coating portion.

Coating pots are well known in the art. Any coating pot design can be used in the present invention, so long as the pot comprises a coating portion 12 and a collecting portion 14. Typically, coating pots comprise a metallic shell 16 lined with refractory bricks 18 and high temperature mortar (not shown). Preferably, the metallic shell 16 is made of structural steel. The coating pot 10 of the present invention can be made of any material that has sufficient strength to contain the molten metal and that can withstand the operating temperatures of the molten bath, about 790° F. to about 900° F.

A coating roll 20, typically suspended from a frame (not shown), is immersed in the molten metal of the coating pot. The metal strip 22 to be coated enters the molten bath in the coating pot 10, wraps around the coating roll 20, and then exits the coating pot 10 to travel on for further processing. There is no limit on the types of coating roll 20s and coating processes that can be employed with the coating pot 10 of the present invention. Any coating process that includes zinc in the molten coating material can be used in the coating pot 10 of the present invention.

The coating pot 10 of the present invention comprises a coating portion 10, which is that portion of the coating pot 10 directly below the coating roll 20. The coating portion 12 is shallower than the collecting portion 14 of the pot. The shallowness of the coating portion 12 encourages higher molten metal flow through the coating area. This higher flow minimizes the accumulation of bottom dross and encourages any dross particles that do form to remain suspended in the molten metal bath. Because of the circulation, the molten zinc and dross particles migrate to the collecting portion 14.

The coating pot 10 further comprises a collecting portion 14, which is located to one side of the coating portion. The collecting portion 14 has a depth that is greater than that of the coating portion. This deeper portion creates a place where the velocity of the molten coating metal is less than the terminal velocity of the dross particles. This encourages sedimentation of the dross particles in the collecting area. The deeper section of the coating pot 10 also provides an accumulation area for the bottom dross that has migrated from the coating area, so that it may be removed later by a dross removal mechanism without interfering with the coating. To promote the sedimentation of the dross particles in the collecting portion 14, it is necessary to avoid creating turbulence in the collecting portion 14. Therefore, the collecting portion 14 should be free of any stirrers, mixers or other devices that would increase the flow rate.

Dross removal mechanisms are well known and can include mechanical scoops or a pumping mechanism. Preferably, the dross removal mechanism is a dross pump 24, such as that described in U.S. Pat. No. 5,961,285. Method and Apparatus for Removing and Recovering Bottom Dross from Molten Metal During Galvannealing and Galvanizing, Meneice, issued Oct. 5, 1999, and incorporated herein by reference.

Generally, the depth of the coating portion 12 should be minimized and the depth of the collecting portion 14 should be maximized. The shallowness of the coating portion 12 is limited by the coating equipment, such as the coating roll 20. The coating portion 12 must be deep enough to allow the complete immersion of the metal strip 22 in the molten bath. Preferably, the coating portion 12 is about 40" to about 100" deep. More preferably, it is about 83.5" (2.1 m) deep. The depth of the collecting portion 14 must be sufficient to reduce the velocity of the molten metal below its terminal velocity, where the dross particles can settle out of the molten bath. It is limited by the ability to remove the dross collected on the bottom. Preferably, the collecting portion 14 is about 52" to about 130" deep. More preferably, if a dross pump 24 is used to remove the collected dross, the collecting portion 14 is about 6" (15.2 cm) deeper than the length of the pump. Most preferably, the collecting portion 14 is about 110.5" (2.8 m) deep. Preferably, the ratio of the depth of the collecting portion 14 to the depth of the coating portion 12 is in the range of about 1.1 to 1.5. More preferably, it is about 1.3:1.

Because the collecting portion 14 is to one side of the coating portion, the dross can be removed during the coating operation without interrupting that operation. Preferably, the collecting portion 14 is located behind the coating portion 12 of the pot. This means that the collecting portion 14 is closer to the strip exiting the molten bath than it is to the strip entering the molten bath.

The coating pot 10 further comprises a transition area. The transition area is located between the coating portion 12 and the collecting portion 14 of the coating pot. It can be any shape, for example, the transition area can be a 90° step from the shallower coating portion 12 to the deeper collecting portion 14. Preferably, it is an angled slope 26. More preferably, the slope is about 45° or less, measured from the horizontal. Most preferably, the slope is about 30°. Dross scoops can more easily clean an angled slope 26; the angled slope 26 is less likely to be chipped by a scoop when the dross is scooped from around it than are the sharper edges of a 90° step.

What is claimed is:

1. A coating pot for coating metal strip with a zinc-containing metal comprising a coating portion, a collecting portion which is free of mixers, stirrers and other devices that would create turbulence in the contents of the collecting portion, and a transition area located between the coating portion and the collecting portion, wherein the transition area is sloped, wherein the depth of the collecting portion is greater than the depth of the coating portion, and wherein the collecting portion is sized and located so that a. the collecting portion is located to only one side of the coating portion;

b. bottom dross accumulates in the collecting portion;

c. the molten zinc-containing metal circulates in the collecting portion at a velocity less than the terminal velocity of the bottom dross; and, d. the bottom dross can be removed from the collecting portion without interrupting a coating process.

2. A coating pot in accordance with claim 1, wherein the ratio of the depth of the collecting portion to the depth of the coating portion is about 1.1 to about 1.5.

3. A coating pot in accordance with claim 2, wherein the ratio is about 1.3:1.

4. A coating pot in accordance with claim 1 wherein the coating portion is about 40" to about 100" deep and the collecting portion is about 52" to about 130" deep.

5. A coating pot in accordance with claim 4 wherein the coating portion is about 83.5" deep and the collecting portion is about 110.5" deep.

6. A coating pot in accordance with claim 1 wherein the transition area is sloped at an angle of about 45° or less from the horizontal.

7. A coating pot in accordance with claim 6 wherein the transition area is sloped at an angle of about 30°.

8. A coating apparatus comprising:

a coating pot comprising a coating portion, a collecting portion which is free of mixers, stirrers and other devices that would create turbulence in the contents of the collecting portion, and a transition area located between the coating portion and the collecting portion, wherein the transition area is sloped, wherein the depth of the collecting portion is greater than the depth of the coating portion, and wherein the collecting portion is sized and located so that a. the collecting portion is located to only one side of the coating portion;

b. bottom dross accumulates in the collecting portion;

c. the molten zinc-containing metal circulates in the collecting portion at a velocity less than the terminal velocity of the bottom dross; and, d. the bottom dross can be removed from the collecting portion without interrupting a coating process;

a coating roll suspended over said coating portion; and a dross removal means.

9. A coating apparatus in accordance with claim 8 wherein said dross removal means is selected from the group consisting of a dross scoop or a dross pump.

10. A coating apparatus in accordance with claim 9 wherein said dross removal means is a dross pump.

11. A coating apparatus in accordance with claim 8, wherein the transition area is sloped at an angle of about 45° or less measured from the horizontal so that dross scoop can easily clean the collecting portion and the transition area from accumulated bottom dross.

* * * * *

UNITED STATES PATENT AND TRADEMARK OFFICE
CERTIFICATE OF CORRECTION

PATENT NO. : 6,582,520 B1  
DATED : June 24, 2003  
INVENTOR(S) : Steven L. Boston et al.

It is certified that error appears in the above-identified patent and that said Letters Patent is hereby corrected as shown below:

<u>Column 6,</u>  
Line 29, "so that dross" should read -- so that the dross --

Signed and Sealed this

Ninth Day of December, 2003

JAMES E. ROGAN  
*Director of the United States Patent and Trademark Office*